US011915405B2

(12) United States Patent
Chaudhary et al.

(10) Patent No.: US 11,915,405 B2
(45) Date of Patent: Feb. 27, 2024

(54) ADDITIVE MANUFACTURING PROCESS MONITORING

(71) Applicant: Applied Optimization, Inc., Fairborn, OH (US)

(72) Inventors: Anil Chaudhary, Fairborn, OH (US); Ethan Van Tilburg, Fairborn, OH (US); Brandon Baucher, Fairborn, OH (US); Tom Ryan, Ann Arbor, MI (US)

(73) Assignee: Applied Optimization, Inc., Fairborn, OH (US)

( * ) Notice: Subject to any disclaimer, the term of this patent is extended or adjusted under 35 U.S.C. 154(b) by 470 days.

(21) Appl. No.: 17/202,945

(22) Filed: Mar. 16, 2021

(65) Prior Publication Data

US 2022/0301143 A1    Sep. 22, 2022

(51) Int. Cl.
*G06T 7/00* (2017.01)
*G06T 7/11* (2017.01)
(Continued)

(52) U.S. Cl.
CPC ............ *G06T 7/0004* (2013.01); *B22F 10/85* (2021.01); *B22F 12/90* (2021.01); *B33Y 30/00* (2014.12);
(Continued)

(58) Field of Classification Search
CPC ............ G02B 26/0816; G02B 26/101; G02B 26/105; G02B 27/1006; G02B 27/106; G02B 7/02; G06T 7/0004; G06T 7/11; G06T 2207/30164; G06T 2207/30136; B33Y 50/02; B33Y 30/00; B33Y 10/00; B22F 12/90; B22F 10/85; B22F 10/28
See application file for complete search history.

(56) References Cited

U.S. PATENT DOCUMENTS

| | | | | |
|---|---|---|---|---|
| 4,872,756 A | * | 10/1989 | Hill | ............................ G01J 9/02 356/517 |
| 10,112,262 B2 | * | 10/2018 | Cheverton | ............ B23K 26/034 |

(Continued)

OTHER PUBLICATIONS

Carnegie Mellon University and Applied Optimization, Inc. selected for awards under the Modelling Challenge for Additive Manufacturing; America Makes; NCDMM; 3 pages.
(Continued)

*Primary Examiner* — Sang H Nguyen
(74) *Attorney, Agent, or Firm* — Taft Stettinius & Hollister LLP (57) ABSTRACT

An exemplary method generally includes reflecting, by a movable reflector, electromagnetic radiation from a field of view in a region of interest of an additive manufacturing machine to an optics assembly; splitting, by a beam splitter of the optics assembly, the electromagnetic radiation into a plurality of beams; directing the plurality of beams to a plurality of optical sensors such that each optical sensor of the plurality of optical sensors receives a corresponding and respective beam of the plurality of beams; generating, by the plurality of optical sensors, a plurality of outputs, each output including information related to a corresponding and respective beam; and controlling, by a controller, the movable reflector to move the field of view to maintain a predetermined relationship between the field of view and a moving build point within the region of interest.

31 Claims, 5 Drawing Sheets

(51) Int. Cl.
*B33Y 30/00* (2015.01)
*B33Y 50/02* (2015.01)
*B22F 10/85* (2021.01)
*B22F 12/90* (2021.01)
*G02B 26/08* (2006.01)
*G02B 26/10* (2006.01)
*G02B 7/02* (2021.01)
*G02B 27/10* (2006.01)
*B22F 10/28* (2021.01)
*B33Y 10/00* (2015.01)

(52) U.S. Cl.
CPC ............... *B33Y 50/02* (2014.12); *G02B 7/02* (2013.01); *G02B 26/0816* (2013.01); *G02B 26/101* (2013.01); *G02B 27/106* (2013.01); *G06T 7/11* (2017.01); *B22F 10/28* (2021.01); *B33Y 10/00* (2014.12); *G06T 2207/30136* (2013.01); *G06T 2207/30164* (2013.01)

(56) References Cited

U.S. PATENT DOCUMENTS

| | | | |
|---|---|---|---|
| 10,569,364 B2 | 2/2020 | Shi et al. | |
| 10,821,508 B2 | 11/2020 | Cheverton et al. | |
| 10,845,459 B2 | 11/2020 | Bruder et al. | |
| 10,914,677 B2 | 2/2021 | Gold et al. | |
| 2011/0114839 A1* | 5/2011 | Stecker | H01J 37/304 250/307 |
| 2015/0092043 A1* | 4/2015 | Baribault | G01M 11/31 348/125 |
| 2018/0071999 A1* | 3/2018 | Karlen | G01N 21/8806 |
| 2018/0154443 A1* | 6/2018 | Milshtein | B23K 26/0626 |
| 2018/0194064 A1 | 7/2018 | Chen et al. | |
| 2018/0246321 A1* | 8/2018 | Campton | B22F 10/28 |
| 2018/0369918 A1* | 12/2018 | Gold | B22F 10/50 |
| 2019/0101489 A1 | 4/2019 | Darwin | |
| 2019/0134748 A1* | 5/2019 | Roychowdhury | B23K 26/342 |
| 2019/0283332 A1* | 9/2019 | Brown | B22F 10/31 |
| 2020/0147868 A1 | 5/2020 | Gold | |
| 2020/0391291 A1 | 12/2020 | Herzog et al. | |
| 2021/0023654 A1* | 1/2021 | Norman | B33Y 10/00 |
| 2021/0039167 A1* | 2/2021 | Ashton | B22F 12/44 |
| 2021/0046546 A1 | 2/2021 | Madigan et al. | |
| 2021/0162509 A1* | 6/2021 | Ferrar | B33Y 50/02 |

OTHER PUBLICATIONS

Sarah K. Everton; Review of In-Situ Process Monitoring and In-Situ Metrology for Metal Additive Manufacturing; Elsevier; Materials and Design; 2016; 15 pages; vol. 95.

Qilin Guo et al.; Transient Dynamics of Powder Spattering in Laser Powder Bed Fusion Additive Manufacturing Process Revealed by In-Situ High-Speed High-Energy X-Ray Imaging; Elsevier; Acta Materialia; 2018; 13 pages; vol. 151.

A.V. Gusarov et al.; Radiation Transfer in Metallic Powder Beds Used in Laser Processing; Elsevier; Journal of Quantitative Spectroscopy & Radiative Transfer; 2010; 11 pages; vol. 111.

Dongming Hu et al.; Sending, Modeling and Contgrol for Laser-Based Additive Manufacturing; Pergamon; International Journal of Machine Tools & Manufacture; 2003; 10 pages; vol. 43.

Abdalla R. Nassar et al.; Intra-Layer Closed-Loop Control of Build Plan During Directed Energy Additive Manufacturing of Ti-6A1-4V; Elsevier; Additive Manufacturing; 2015; 14 pages; vol. 6.

Lore-Anne Ponirakis; Feed-Forward Controls for Laser Powder Bed Fusion Based Metal Additive Manufacturing; Navy SBIR; 2018; 2 pages.

Thomas G. Spears et al.; In-Process Sensing in Selective Laser Melting (SLM) Additive Manufacturing; Integrating Materials and Manufacturing Innovation; 2016; 26 pages; vol. 5 No. 2.

Jonathan Stef et al.; Mechanism of Porosity Formation and Influence on Mechanical Properties in Selective Laser Melting of Ti-6A1-4V Parts; Elsevier; Materials and Design; 2018; 14 pages; vol. 156.

John C. Steuben et al.; Enriched Analytical Solutions for Additive Manufacturing Modeling and Simulation; Elsevier; Additive Manufacturing; 2019; 12 pages; vol. 25.

Qian Wang et al.; Model-Based Feedforward Control of Laser Powder Bed Fusion Additive Manufacturing; Elsevier; Additive Manufacturing; 2020; 14 pages; vol. 31.

* cited by examiner

ADDITIVE MANUFACTURING PROCESS MONITORING

TECHNICAL FIELD

The present disclosure generally relates to additive manufacturing, and more particularly but not exclusively relates to systems and methods for monitoring additive manufacturing processes.

BACKGROUND

Metal additive manufacturing (AM) now constitutes a several-billion-dollar market size. Notably, AM has been adopted for production of high-value aerospace, defense, and medical components. However, there remain concerns regarding repeatable production of high quality, defect-free components. To this end, in-situ sensing has been proposed as a means towards measuring process physics and associated build quality.

Unfortunately, there remain significant barriers related to in-situ process monitoring and the development of metrics to characterize the quality of AM parts. Monitoring process physics may require in-situ sensing throughout the entire build at the interlayer, intralayer, and melt pool levels. Achieving fidelity at these three scales requires high-resolution, a large field of view (FOV), and a fast data rate. These specifications are largely unachievable by off-the-shelf in-situ sensors. Single-point detectors such as photodiodes or pyrometers, are capable of recording high-resolution data at fast rates, however their FOV is restricted. Large FOV can be achieved with visible or infrared camera systems, however, the vast amount of data limits the rate at which data can be recorded. Thus, solutions to monitoring the entirety of the build process, lie either with the use of multiple sensors operating at differing resolutions and frame rates, or the use of high-fidelity, high-speed sensors.

While high-fidelity laboratory-scale sensors, such as high-speed visible (VIS), infrared (IR), or X-ray imaging, have been recently adapted to elucidate AM process physics, their high cost, limited field of view, and extreme data rates inhibit their use with commercially-available hardware and software systems and limit their use to simplified experiments in laboratory settings. For instance, while synchrotron X-ray imaging has been widely used to capture process dynamics for AM processes, experiments are limited to idealized environments (e.g., measurement of a single powder layer between two glassy carbon windows). High-speed VIS and IR imaging, which can be used to evaluate melt pool surface geometry and map complex process interactions, are also limited to a small field of view for melt-pool, due to limitations associated with commercially available resolution, capture rates, and data transfer requirements. Simply stated, these approaches are difficult to apply for the simplest of experiments (e.g. single-tracks) and are neither scalable nor appropriate for validating quality of AM parts.

Monitoring AM processes with multiple sensors, however, poses its own list of complications. Namely, the introduction of multiple sensors implies variations in sensor-to-sensor viewing angle and FOV. These variations often require careful calibration for each sensor and increase the complexity to cross-register, associate, and validate the data collected by the simultaneous in-situ sensing because the signals being measured are commonly a joint function of the sensing location on the build plane and its viewing angle.

Similar limitations apply to characterizing the AM process physics. Modeling the physics for interlayer, intralayer, and melt pool behavior is fundamentally different from each other in terms of the algorithms and boundary conditions. In addition, the powder recoat is a statistical process, the physics of laser-material interaction is complex, and high-temperature thermophysical data can lack fidelity. Thus, many methods to model the AM process physics use multi-scale, multi-physics approach, which includes a sequence of solutions at each time step.

Ultimately, the calibration of sensor data with process physics to characterize the AM part quality may require a multi-scale approach. A fundamental problem is therefore a mismatch of spatial resolution, temporal resolution, and fidelity. As such, there is a need for the integration and applications of methods to facilitate repeatable calibration between multi-scale in-situ process monitoring sensors and AM part quality. For these reasons among others, there remains a need for further improvements in this technological field.

SUMMARY

An exemplary method generally includes reflecting, by a movable reflector, electromagnetic radiation from a field of view in a region of interest of an additive manufacturing machine to an optics assembly; splitting, by a beam splitter of the optics assembly, the electromagnetic radiation into a plurality of beams; directing the plurality of beams to a plurality of optical sensors such that each optical sensor of the plurality of optical sensors receives a corresponding and respective beam of the plurality of beams; generating, by the plurality of optical sensors, a plurality of outputs, each output including information related to a corresponding and respective beam; and controlling, by a controller, the movable reflector to move the field of view to maintain a predetermined relationship between the field of view and a moving build point within the region of interest. Further embodiments, forms, features, and aspects of the present application shall become apparent from the description and figures provided herewith.

DETAILED DESCRIPTION OF ILLUSTRATIVE EMBODIMENTS

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

Figure 1:
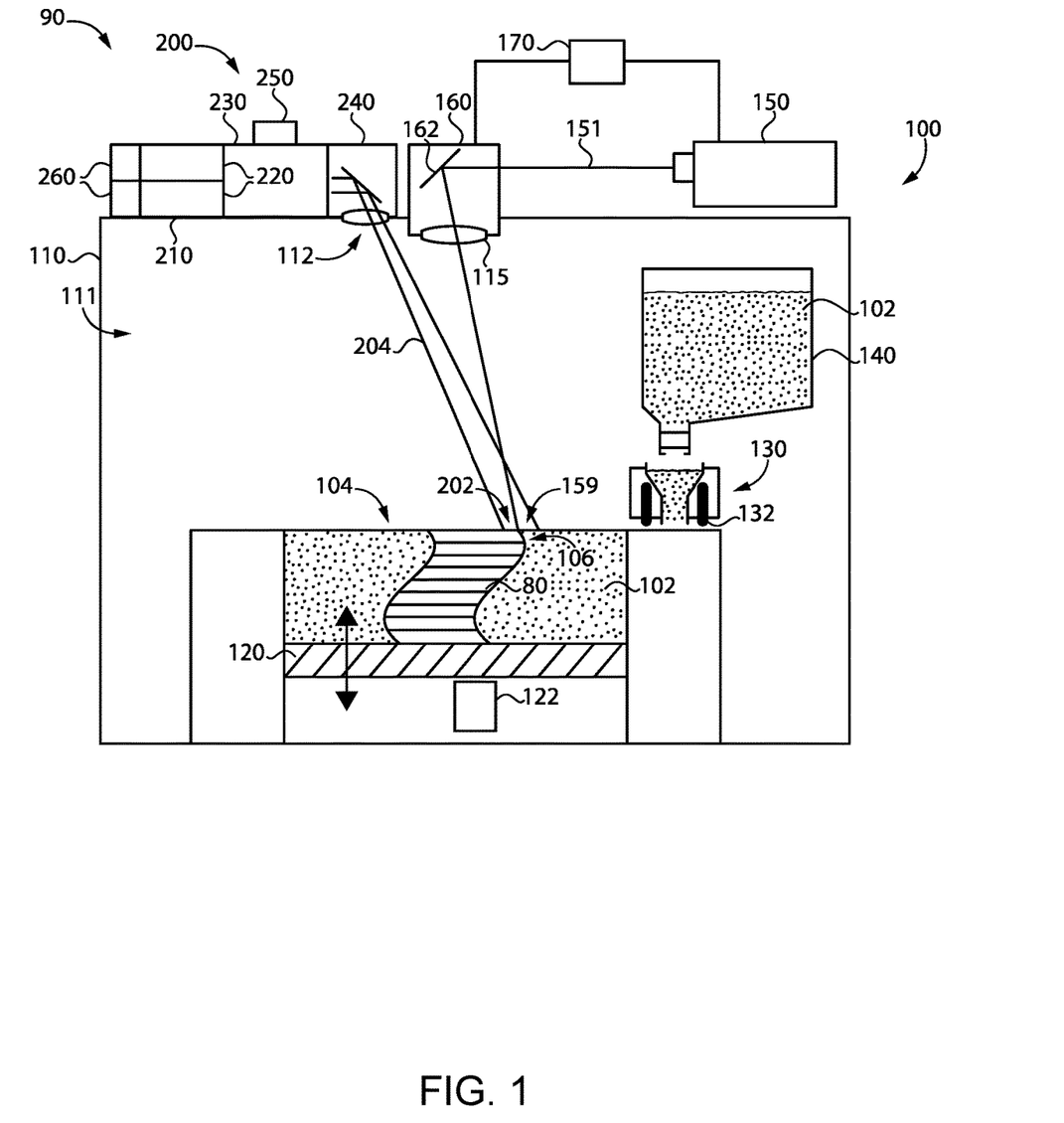
FIG. 1 is a schematic illustration of an additive manufacturing system including a monitoring assembly according to certain embodiments.

With reference to FIG. 1, illustrated therein is an additive manufacturing system 90 according to certain embodiments. The system 90 generally includes a conventional additive manufacturing (AM) machine 100 and a modular add-on monitoring assembly 200 according to certain embodiments. As described herein, the AM machine 100 is configured to manufacture a workpiece 80 in a layer-by-layer fashion by scanning an energy beam 151 across a build plane 104 including one or more layers of powdered material 102, and the monitoring assembly 200 is configured to monitor the scanning via two or more optical sensors 260.

The AM machine 100 generally includes a housing 110, a build table 120 positioned in the housing 110, a powder distributor 130 operable to distribute powder 102 across the build table 120 to define a build plane 104, a reservoir 140 that provides powder 102 to the powder distributor 130, an energy beam generator 150 operable to generate an energy beam 151, a mirror galvanometer 160 operable to redirect the energy beam 151 onto the build plane 104 thereby create an illumination point 159, and a control system 170 that controls operation of the AM machine 100.

The housing 110 defines a chamber 111 in which the build table 120 is positioned, and includes a first window 112 and a second window 115. The build plane 104 is visible via the first window 112, and, as described herein, a portion of the monitoring assembly 200 is positioned in the vicinity of the first window 112 such that electromagnetic (EM) radiation (e.g., visible light, IR rays, ultraviolet light, and/or X-rays) are able to enter the monitoring assembly 200 via the first window 112. The build plane 104 is also visible via the second window 115, and the mirror galvanometer 160 directs the energy beam 151 onto the build plane 104 to create the illumination point 159.

The build table 120 supports the workpiece 80 and the surrounding powder 102, and is operably coupled with an actuator 122 operable to move the build table 120 vertically. The actuator 122 may move the build table 120 under control of the control system 170 and may, for example, comprise a motor or hydraulic cylinder. As described herein, after a particular layer of powder 102 has been scanned by the energy beam 151, the build table 120 lowers by the thickness of each powder layer to accommodate the subsequent layer to be distributed by the powder distributor 130.

The powder distributor 130 is configured to distribute powder 102 across the top layer once the build table 120 has been lowered by the appropriate vertical displacement. The powder distributor 130 receives powder 102 from the reservoir 140, and moves along the build plane 104 to distribute the powder 102 to thereby create a new powder layer. The powder distributor 130 may, for example, be under the control of the control system 170. In certain embodiments, the powder distributor 130 may include one or more levelers 132, such as blades or rollers, which may aid in ensuring that the powder 102 is distributed evenly across the build plane 104.

The reservoir 140 holds the powder 102 to be distributed by the powder distributor 130, and fills the powder distributor 130 when appropriate. In the illustrated embodiment, the powder 102 comprises metal powder. Additionally or alternatively, the powder 102 may comprise another form of powder, such as ceramic powder.

The energy beam generator 150 is configured to generate the energy beam 151 with a power sufficient to melt the powder 102 at and around the illumination point 159, thereby creating a melt pool 106 that subsequently hardens to form a part of the workpiece 80. The illumination point 159 may thus alternatively be referred to as the build point 159. In the illustrated form, the energy beam generator 150 is provided in the form of a laser generator, and the energy beam 151 is provided in the form of a laser beam. It is also contemplated that the beam 151 may be provided as another form of energy beam (e.g., an electron beam), and that the energy beam generator 150 may be configured to generate such other form of energy beam.

The mirror galvanometer 160 includes a mirror 162, and is configured to move the mirror 162 to direct the energy beam 151 across the build plane 104 under control of the control system 170. More particularly, the control system 170 controls the mirror galvanometer 160 to direct the energy beam 151 based on a model of the workpiece 80 to build the workpiece 80 according to the model.

The control system 170 controls various aspects of the building of the workpiece 80, such as the movement of the build table 120, the distribution of the powder 102 by the powder distributor 130, and the direction of the energy beam 151 by the mirror galvanometer 160. Certain exemplary features that may be associated with the control system 170 are provided below with reference to FIG. 10.

In the illustrated form, the AM machine 100 is provided in the form of a laser powder bed fusion additive manufacturing machine. It should be appreciated, however, the monitoring assembly 200 described herein may be used in connection with other forms of additive manufacturing machines, including but not limited to stereolithography AM machines, material jetting AM machines, binder jetting AM machines, directed energy deposition AM machines, and wire-fed AM machines.

As one example, the AM machine 100 may be provided in the form of a stereolithography AM machine in which layers of the workpiece 80 are iteratively generated by scanning an energy beam (e.g., an ultraviolet beam) across a photocurable resin. In such forms, the beam 151 may be an ultraviolet beam, and the build point 159 may be the point at which the ultraviolet beam strikes the photocurable resin.

As another example, the AM machine 100 may instead be provided in the form of a material jetting AM machine in which layers of the workpiece are iteratively generated by scanning a beam or jet of building material across the region of interest to build the workpiece. In such forms, the jet of building material may be considered to provide the build beam 151, and the build point 159 may be the point at which the build beam 151 intersects the region of interest to build the workpiece 80. Similarly, the AM machine may be provided in the form of a binder jetting AM machine in which layers of the workpiece are iteratively generated by scanning a beam or jet of binder across the build plane to bind previously-deposited material, thereby building the workpiece. In such forms, the jet of binder may be considered to provide the build beam 151, and the build point 159 may be the point at which the binder jet strikes the deposited material to build the workpiece 80.

As should be evident from the foregoing, the build beam 151 may be provided in many different forms, including but not limited to the form of an energy beam (e.g., a laser beam, an electron beam, or an ultraviolet beam) or a jet of build material or binder. Thus, embodiments of the moving build point 159 are not limited to an illumination point, but may also encompass at which build material or binder are deposited on the workpiece 80. Moreover, embodiments of the region of interest are not limited to the build plane 104, but may also encompass a three-dimensional region of interest (e.g., in embodiments in which the AM machine is provided in the form of a material deposition AM machine).

Figure 2:
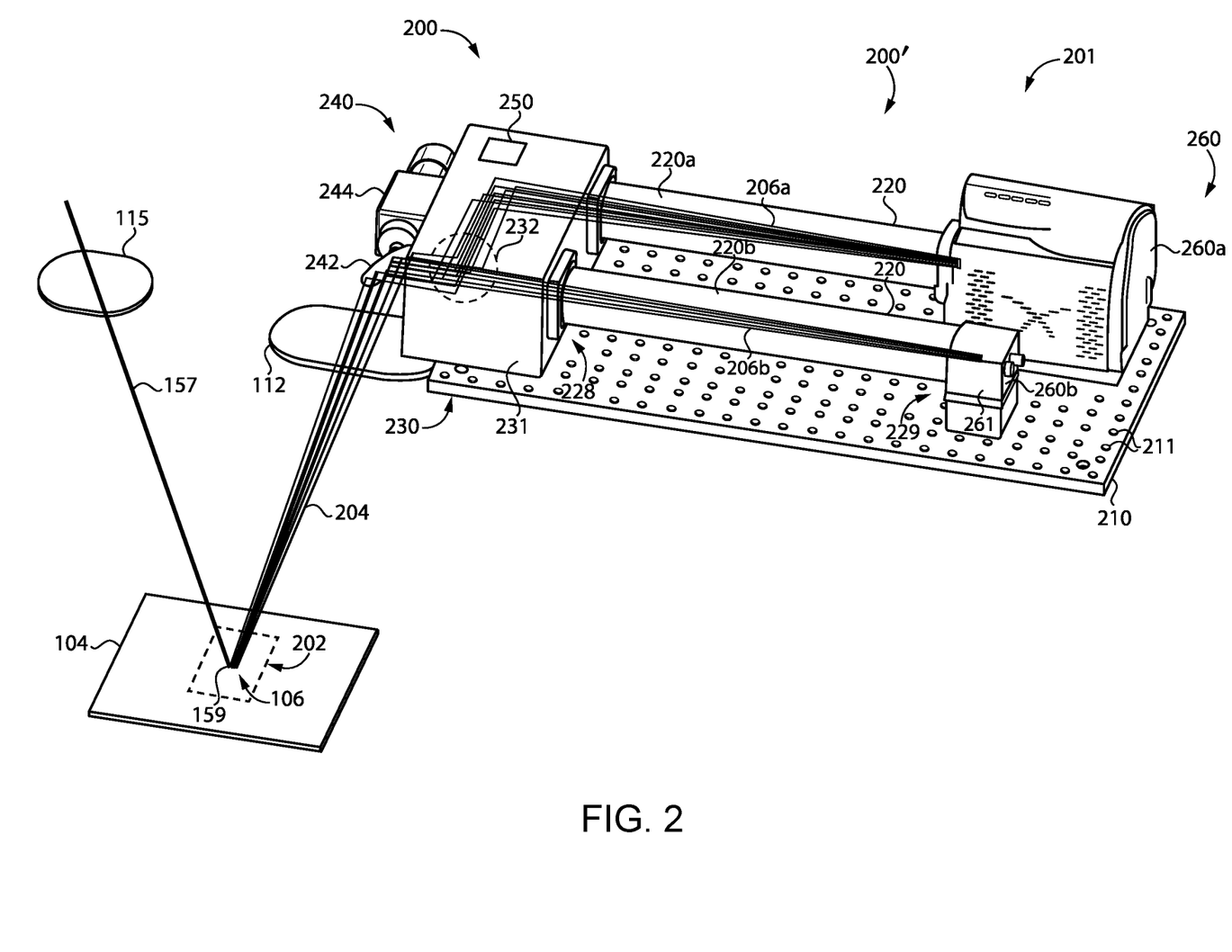
FIG. 2 is a perspective illustration of the monitoring assembly.
Figure 3:
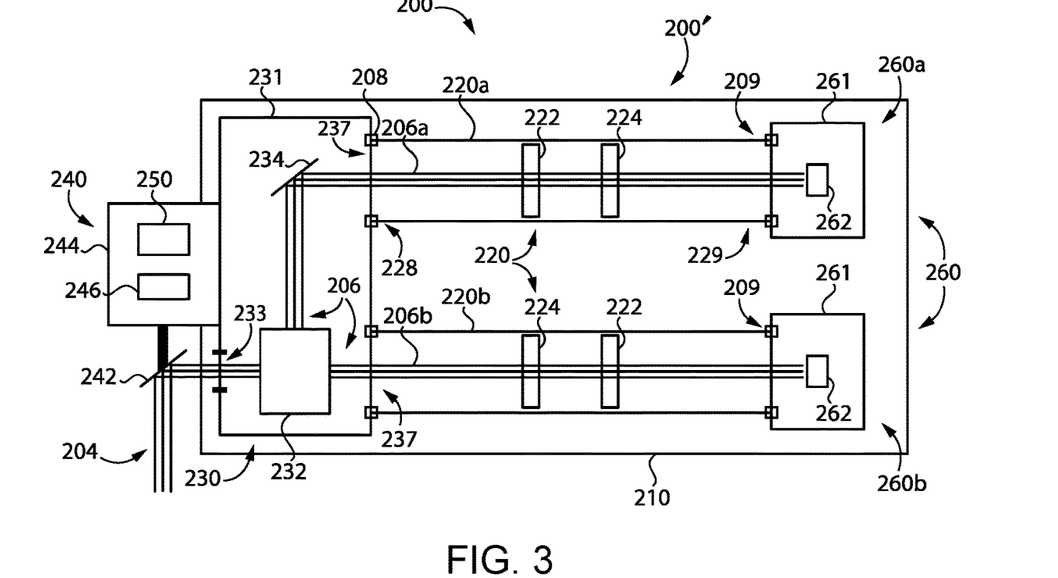
FIG. 3 is a schematic illustration of the monitoring assembly.

With additional reference to FIGS. 2 and 3, the monitoring assembly 200 is mounted to the housing 110 in the vicinity of the first window 112, and generally includes a base plate 210, a plurality of lens benches 220 mounted to the base plate 210, an optics assembly 230 mounted to the base plate 210, a movable reflector 240 configured to reflect electromagnetic radiation from within a field of view (FOV) 202 to the optics assembly 230, a controller 250 configured to move the movable reflector 240 to maintain a predetermined relationship between the illumination point 159 and the FOV 202, and a plurality of optical sensors 260, each of which may be coupled to a corresponding one of the lens benches 220. As described herein, the optics assembly 230 includes a beam splitter 232 that splits the electromagnetic (EM) radiation 204 received from the movable reflector 240 into a plurality of beams 206, each of which is directed along a corresponding lens bench 220 to a corresponding optical sensor 260.

In certain forms, one or more components of the monitoring assembly 200 may be provided with the AM machine 100 at the time of sale of the AM machine 100. In such forms, the controller 250 may not necessarily be included, and the functions thereof may be performed by the control system 170. In certain embodiments, one or more components of the monitoring assembly 200 may be provided in an add-on kit 200' for an existing AM machine 100. Further details regarding each of these forms are provided herein.

The base plate 210 is configured for mounting to the housing 110 of the AM machine 100 at a location in the vicinity of the first window 112, and may include features that facilitate such mounting. For example, the base plate 210 may include one or more apertures 211 that align with corresponding mounting features formed in the housing 110 to facilitate mounting of the base plate 210 to the housing 110, for example via one or more threaded fasteners. In certain embodiments, such as those in which the monitoring assembly 200 is provided to the AM machine 100 at the time the machine 100 is manufactured, the base plate 210 may constitute a portion of the housing 110. In the illustrated form, the base plate 210 is further configured to facilitate the removable mounting of one or more other components of the monitoring assembly 200 to the base plate 210. For example, the apertures 211 may provide mounting locations for the lens benches 220 and/or the sensors 260.

The plurality of lens benches 220 includes at least a first lens bench 220a and a second lens bench 220b. Each of the lens benches 220 is configured to direct a corresponding beam 206 from the optics assembly 230 to the corresponding optical sensor 260, and may further be configured to condition the beam 206 in one or more manners. For example, one or more of the lens benches 220 may include one or more lenses 222 operable to focus the corresponding beam 206 and/or one or more filters 224 to remove or reduce one or more frequencies of electromagnetic radiation from the corresponding beam 206. In certain embodiments, one or more of the lens benches 220 may have an opaque layer that shields the interior of the lens bench 220 from external light.

Each lens bench 220 has a proximal end 228 adjacent the optics assembly 230 and an opposite distal end 229 adjacent the corresponding optical sensor 260. In the illustrated form, each proximal end 228 is removably coupled with a housing 231 of the optics assembly 230, and each distal end 229 is removably coupled with a housing 261 of the corresponding optical sensor 260. In certain embodiments, the proximal end 228 and/or the distal end 229 may include features that facilitate the removable coupling of the lens bench 220 with the corresponding component. In the illustrated form, the proximal ends 228 and the optics assembly housing 231 cooperate to define proximal mating fittings 208, and the distal ends 229 and the optical sensor housings 261 cooperate to define distal mating fittings 209. For example, each of the proximal end 228 and the distal end 229 may be threaded to facilitate threaded coupling with the housings 231, 261. It is also contemplated that one or both of the ends 228, 229 may not necessarily include coupling features, or may include another form of quick coupling feature (e.g., bayonet coupling features, press fit coupling features, or other coupling features).

The optics assembly 230 includes a beam splitter 232, and in the illustrated form further includes a housing 231 and a pair of mirrors 234. The housing 231 is mounted to the base plate 210, and shields the internal components of the optics assembly 230 from interference by outside light. The housing 231 includes an inlet aperture 233 through which EM radiation 204 enters the optics assembly 230, and further includes a plurality of outlet apertures 237 by which the beams 206 exit the housing 231. In certain embodiments, the inlet aperture 233 and/or one or more of the outlet apertures 237 may be provided with a lens. In the illustrated form, each of the outlet apertures 237 interfaces with the corresponding lens bench 220 via quick connect fittings 208 as described above.

The beam splitter 232 is configured to split the electromagnetic radiation 204 reflected by the movable reflector 240 such that the EM radiation 204 emitted from the FOV 202 is split into a plurality of beams 206, including at least a first beam 206a and a second beam 206b. A portion optics assembly 230 (e.g., the beam splitter 232) may be configured to collimate the electromagnetic radiation such that the plurality of beams 206 are collimated beams. In certain embodiments, the beam splitter 232 may, for example, take the form of a dual-prism beam splitter or a half-silvered mirror. In certain embodiments, the beam splitter 232 may comprise a coating by which EM radiation is selectively reflected based upon the wavelength of the EM radiation. For example, the beam splitter 232 may reflect radiation above a particular wavelength to form the first beam 206a while permitting radiation below the particular wavelength to pass through the beam splitter 232 to form the second beam 206B.

In certain forms, the beam splitter 232 may be configured to split the EM radiation 204 into the plurality of beams 206 without regard to the frequency/wavelength of the EM radiation 204 being split such that each of the beams 206 is substantially identical. In the illustrated form, however, the beam splitter 232 is configured to split the EM radiation 204 based on the frequency/wavelength of the EM radiation 204 such that the first beam 206a and the second beam 206b comprise different wavelengths/frequencies of electromagnetic radiation. More particularly, the illustrated beam splitter 232 is configured to split the EM radiation 204 into a first beam 206a primarily comprising electromagnetic radiation in the infrared spectrum (IR) with wavelengths in the range of 0.75 µm to 15 µm, and a second beam 206b primarily comprising electromagnetic radiation in the visible spectrum (VIS) with wavelengths in the range of 380 nm to 750 nm.

In certain embodiments, the IR beam 206a may primarily comprise near infrared (NIR) with wavelengths in the range of 0.75 µm to 1.4 µm. In certain embodiments, the IR beam 206a may primarily comprise short-wavelength infrared (SWIR) with wavelengths in the range of 1.4 µm to 3 µm. In certain embodiments, the IR beam 206a may primarily comprise mid-wavelength infrared (MWIR) with wavelengths in the range of 3 µm to 8 µm. In certain embodiments, the IR beam 206a may primarily comprise long-wavelength infrared (LWIR) with wavelengths in the range of 8 µm to 15 µm. In certain embodiments, the IR beam 206a may comprise a combination including one or more of NIR radiation, SWIR radiation, MWIR radiation, and/or LWIR radiation.

While the illustrated beam splitter 232 is configured to split the EM radiation 204 into an IR beam 206a and a VIS beam 206b, it should be appreciated that the beam splitter 232 may instead be configured to split the EM radiation 204 into a different combination of beams. For example, the beam splitter 232 may be configured to split the EM radiation 204 into two or more beams, wherein one or more of the beams 206 primarily comprises ultraviolet radiation, VIS radiation, NIR radiation, SWIR radiation, MWIR radiation, and/or LWIR radiation, and another of the beams primarily comprises electromagnetic radiation in a frequency range different from the first beam. Additionally or alternatively, the optics assembly 230 and/or one or more of the lens benches may include optics (e.g., filters) that cause one or more of the beams 206 to primarily comprise ultraviolet radiation, VIS radiation, NIR radiation, SWIR radiation, MWIR radiation, and/or LWIR radiation when the beam enters the corresponding optical sensor 260.

As noted above, the illustrated optics assembly 230 includes a plurality of mirrors 234 that aid in directing the beams 206 along the corresponding lens benches 220. While the illustrated optics assembly 230 includes two mirrors 234, it should be appreciated that the optics assembly 230 may include more or fewer mirrors 234. In certain embodiments, the optics assembly 230 lacks mirrors 234, and the beams 206 travel directly from the beam splitter 232 to the corresponding lens benches 220. In certain embodiments, the optics assembly 230 may include additional or alternative devices that aid in conditioning the electromagnetic radiation passing therethrough, such as lenses and/or filters. In certain embodiments, such as those in which one or more of the lens benches 220 comprises one or more lenses 222 and/or one or more filters 224, such lens bench(es) 220 may be considered to comprise a portion of the optics assembly 230.

The movable reflector 240 generally includes a mirror 242 and an actuator 244 such as a scanning motor, which is configured to move the mirror 242 under control of the controller 250. The mirror 242 reflects the EM radiation 204 from the FOV 202 to the entrance of the optics assembly 230, where the EM radiation 204 is split into a plurality of beams 206. As noted above, each beam 206 travels along a corresponding lens bench 220 to a respective optical detector 260. As a result, each optical detector 260 is provided with electromagnetic radiation from the same FOV 202. While other forms are contemplated, in the illustrated embodiment, the movable reflector 240 is provided in the form of a mirror galvanometer.

Figure 4:
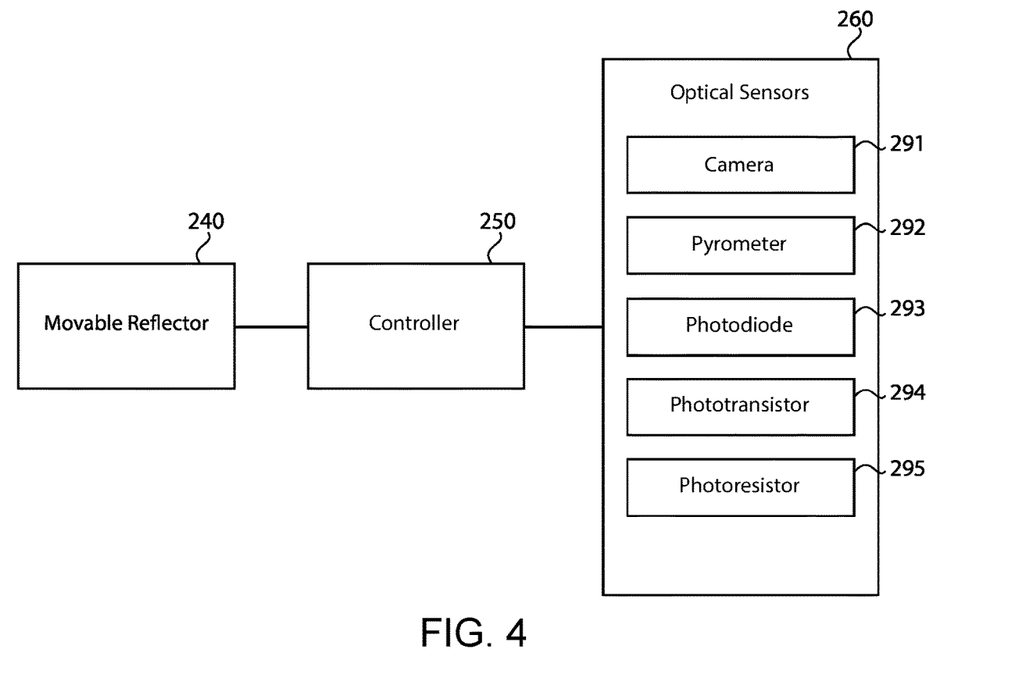
FIG. 4 is a schematic block diagram of the monitoring assembly.

With additional reference to FIG. 4, the controller 250 is in communication with the movable reflector 240 and is operable to control the movable reflector 240 such that the moving illumination point 159 maintains a predetermined relationship with the FOV 202 for the optical detectors 260. In certain embodiments, the controller 250 may further be in communication with one or more of the optical detectors 260 such that the controller 250 receives information generated by the optical detector(s) 260 with which the controller 250 is in communication. Further details regarding the control of the movable reflector 240 by the controller 250 are provided below with reference to FIG. 8.

The optical sensors 260 are provided at the distal ends 229 of the lens benches 220 such that each optical sensor 260 is positioned to receive the beam 206 directed along the corresponding lens bench 220. In the illustrated form, the plurality of optical sensors 260 includes a first optical sensor 260a positioned at the distal end 229 of the first lens bench 220a and operable to receive the first beam 206a, and a second optical sensor 260b positioned at the distal end 229 of the second lens bench 220b and operable to receive the second beam 206b. In the illustrated form, each optical sensor 260 includes a housing 261 and a sensing region 262 mounted within the housing 261. Each housing 261 is configured for coupling with the corresponding lens bench 220, either directly or via one or more adapters. For example, the housing 261 of the first optical sensor 260a may include a threaded region by which the housing 261 can be threadedly coupled with the distal end 229 of the first lens bench 220a. The housing 261 of the second optical sensor 260b may likewise include a threaded region by which the housing 261 can be threadedly coupled with the distal end 229 of the second lens bench 220b.

The sensing region 262 is configured to receive the corresponding beam 206, and each optical sensor 260 is configured to generate information based upon one or more characteristics of the beam 206 that illuminates the sensing region 262. In certain embodiments, the sensing region 262 may be a multi-pixel sensing region, for example in embodiments in which the optical sensor 260 is provided in the form of a camera. In such forms, the optical sensor 260 may generate digital images of the FOV 202 in response to the beam 206 striking the sensing region 262. In certain embodiments, the sensing region 262 may not necessarily be pixelated, for example in embodiments in which the optical sensor 260 is provided in the form of a pyrometer. In such forms, the optical sensor 260 may generate value information (e.g., estimated temperature information) in response to the beam 206 striking the sensing region 262.

In certain embodiments, such as those in which the beams 206a, 206b are provided to the optical sensors 260 in different wavelength bands, the optical sensors 260 may be specifically configured to generate information related to such wavelength bands. For example, in embodiments in which the first beam 206a primarily comprises VIS radiation when received by the first sensor 260a, the first sensor 260a may be provided in the form of a visible light camera. As another example, in embodiments in which the second beam 206b primarily comprises MWIR radiation when received by the second sensor 260b, the second sensor 260b may be provided in the form of an MWIR camera. In certain forms, one or more of the optical sensors 260 may be selected from the group including a camera 291, a pyrometer 292, a photodiode 293, a phototransistor 294, and a photoresistor 295. In certain embodiments, one or more of the optical sensors 260 may have high spatial resolution. For example, a camera 291 may be provided with a resolution of one megapixel or greater, or of ten megapixels or greater.

As will be appreciated, the area of the FOV 202 sensed by the optical sensors 260 depends upon a number of factors, such as the size of the mirror 242, the degree of magnification provided by the optics assembly 230 (including any lenses 222 provided in the lens benches 220), and other factors. In order to provide for high spatial resolution of the FOV 202, it may be advantageous to provide the FOV 202, as sensed by the optical sensors 260, with a relatively small FOV 202. For example, the FOV 202 may have an area of 200 mm$^2$ or less. In certain embodiments, the FOV 202 may be provided in a square shape that is about 12 mm (e.g., 12 mm+/−10%) on each side. It should be appreciated, however, that other areas and geometries for the FOV 202 are contemplated.

Figure 5:
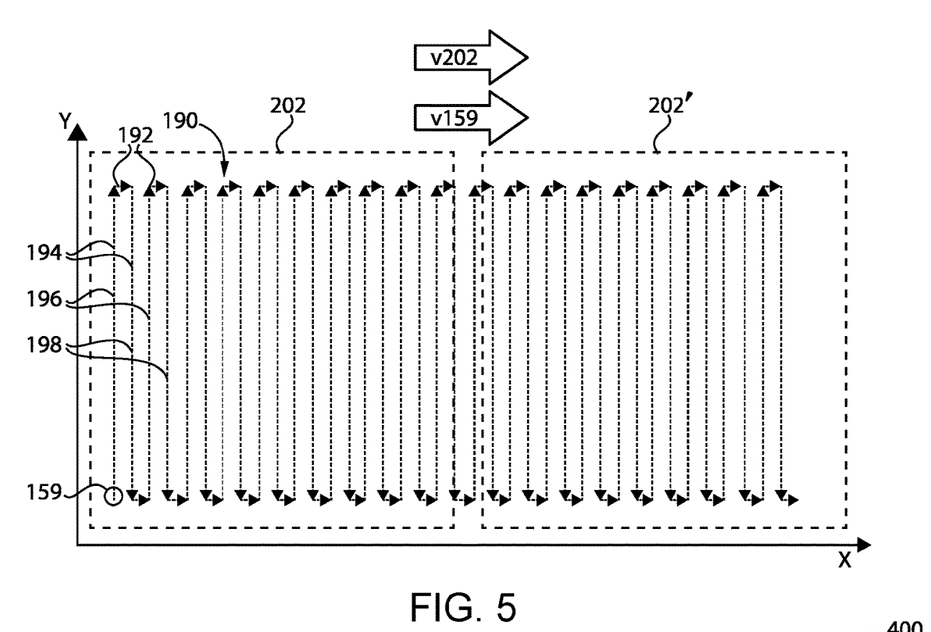
FIG. 5 is a simplified representation of a build path along which a build beam may travel during the manufacture of a workpiece.

With additional reference to FIG. 5, illustrated therein is a simplified example of a build path 190 along which the build point 159 travels during a first timeframe while building the workpiece 80. Also illustrated in FIG. 5 is a coordinate system including a Y-axis and an X-axis.

The illustrated build path 190 includes a plurality of tracks along which the build point 159 travels, including longitudinal or X-direction tracks 192 and lateral or Y-direction tracks 194. The lateral or Y-direction tracks 194 include Y+ tracks 196 extending in the positive Y direction and Y− tracks 198 extending in the negative Y direction. The illustrated build path 190 is a generally rectangular raster scan build path, in which each pair of adjacent lateral tracks 194 is connected by a corresponding longitudinal track 192. When traveling along the build path 190, the moving build point 159 travels along the first Y+ track 196 to the first longitudinal track 192, and then along the first Y− track to the second longitudinal track 192. The process may repeat for the first timeframe until the build path 190 has been completed.

While the illustrated build path 190 is provided as a simplified raster scan for purposes of illustration, it should be appreciated that more complex build paths may be utilized by the AM machine. For example, the tracks may not necessarily be aligned with the axes (e.g., may be oblique to the axes), and/or may include curvilinear portions, such as in the case that the AM machine 100 utilizes a vector scan build plan for at least a portion of the build.

In order to ensure that the build point 159 maintains a predetermined relationship with the FOV 202, the controller 250 may control the movable reflector 240 to move the FOV 202 with a FOV velocity v202 for at least a portion of the first timeframe. In certain forms, the FOV velocity v202 is selected based upon the average build point velocity v159. Those skilled in the art will readily recognize that, during the first timeframe, the Y-direction velocities of the lateral tracks generally cancel each other out such that the average velocity v159 of the build point 159 is a longitudinal or X-direction velocity. Thus, in the illustrated form, the controller 250 may control the movable reflector 240 to move the FOV 202 with a longitudinal FOV velocity v202.

As noted above, the controller 250 may be configured to control the movable reflector 240 to move the FOV 202 with a FOV velocity v202 to thereby maintain a predetermined relationship between the FOV 202 and the build point 159. In certain embodiments, maintaining the predetermined relationship between the FOV 202 and the build point 159 comprises maintaining the build point 159 within the FOV 202. In certain embodiments, maintaining the relationship between the FOV 202 and the build point 159 comprises maintaining the build point within or adjacent the FOV 202. In certain embodiments, maintaining the relationship between the FOV 202 and the build point 159 comprises maintaining the build point outside the FOV 202, for example to focus the FOV 202 on the tracks recently traveled by the build point 159. In certain embodiments, selecting the FOV velocity v202 based on the average build point velocity v159 comprises selecting the FOV velocity v202 as a predetermined percentage of the average build point velocity v159. In certain embodiments, the predetermined percentage is 100% such that the FOV velocity v202 is selected as the average build point velocity v159.

In order to maintain the predetermined relationship between the FOV 202 and the build point 159, it may be necessary or desirable for the controller 250 to track the build point 159. Several methods by which the build point 159 may be tracked are contemplated herein. In certain embodiments, the controller 250 may be provided with the build plan for the workpiece 80, and may control the movable reflector 240 based on the build plan. Such a build plan may correlate particular timeframes with particular average velocities for the build point 159. For example, the build plan may indicate that the build point 159 will move from a first identified location to a second identified location with a first average build point velocity v159 during a first timeframe. In such forms, the controller 250 may control the movable reflector 240 during at least a portion of the first timeframe to move the FOV 202 with a first FOV velocity v202 selected based upon the first average build point velocity v159 to thereby maintain the predetermined relationship between the FOV 202 and the build point 159.

In certain embodiments, the controller 250 may receive information from one or more of the optical detectors 260, and may control the movable reflector 240 based on information received from the optical detector(s) 260. For example, an optical detector 260 may be provided in the form of a camera, and the controller 250 may process information generated by the camera and control the movable reflector 240 in a manner that causes the build point 159 to maintain the predetermined relationship with the FOV 202 based on the information processed.

In certain embodiments, the controller 250 may be provided with the model by which the AM machine manufactures the workpiece 80 (e.g., a computer aided design or CAD model), and may control the movable reflector 240 based on the model. For example, the model may indicate to the controller 250 that the build point 159 will be in a particular location at a particular time, and the controller 250 may control the movable reflector 240 to ensure the presence of the predetermined relationship between the FOV 202 and the build point 159 at that particular time. Additionally or alternatively, the controller 250 may receive the information generated by the optical sensors 260 and register the information to the model. For example, the controller 250 may correlate the information generated by the optical sensors 260 with the model such that one or more points on the model are known to correspond to particular information generated by the optical sensors 260.

By way of illustration, point (X, Y, Z) on the model may be correlated with information generated by the optical sensors 260 at time t, and point (X', Y', Z') on the model may be correlated with time t'. If a defect is later found in the workpiece 80 at point (X, Y, Z), the information generated by the optical sensors at and/or around time t may be evaluated to determine the source of the defect. Such information may, for example, be useful in preventing and/or detecting future defects. As one example, if the information generated at and/or around time t exhibits an aberrant characteristic (e.g., a temperature flare/dip, an increase or decrease in electromagnetic radiation within one or more wavelength bands, etc.), such an aberrant characteristic may be indicative of a manufacturing anomaly leading to the defect. Thus, if the aberrant characteristic is again noted at time t', the presence of such an aberrant characteristic may be indicative of a defect at point (X', Y', Z') in the workpiece 80. As will be appreciated, such information may be useful not only in evaluating the presence or absence of defects in a particular workpiece 80, but also in detecting or predicting defects in other workpieces and/or conducting research into the process physics of the AM process.

Figure 6:
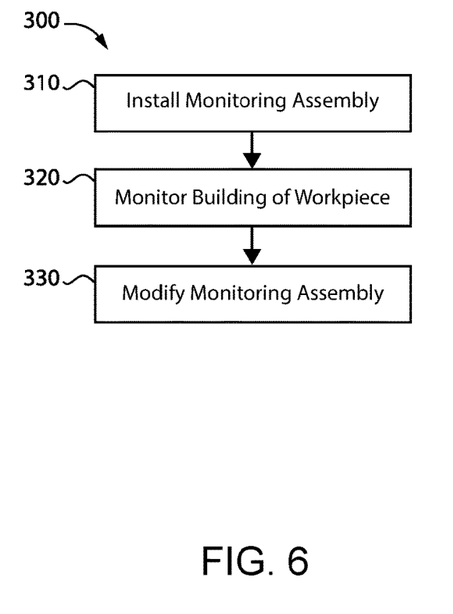
FIGS. 6-9 are schematic flow diagrams of processes according to certain embodiments.

With additional reference to FIG. 6, an exemplary process 300 that may be performed using the AM machine 100 and the monitoring system 200 is illustrated. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 300 is described herein with specific reference to the AM machine 100, monitoring system 200, and associated kit 200' illustrated in FIGS. 1-4, it is to be appreciated that the process 300 may be performed with AM machines, monitoring systems, and/or kits having additional or alternative features.

The illustrated process 300 may begin with block 310, which generally involves installing a monitoring assembly to an AM machine. Block 310 may, for example, involve installing the add-on kit 200' for the monitoring assembly 200 to the AM machine 100. Further details regarding an example process 400 for performing block 310 are provided below with reference to FIG. 7.

The illustrated process 300 includes block 320, which generally involves monitoring the building of a workpiece via a monitoring assembly installed to an AM machine. Block 320 may, for example, involve monitoring the building of the workpiece 80 via the monitoring assembly 200 installed to the AM machine 100. Further details regarding an example process 500 for performing block 320 are provided below with reference to FIG. 8.

The process 300 may further include block 330, which generally involves modifying the monitoring assembly. Block 330 may, for example, involve modifying the monitoring assembly 200 by replacing one or more interchangeable components of the monitoring assembly 200. Further details regarding an example process 600 for performing block 330 are provided below with reference to FIG. 9.

Figure 7:
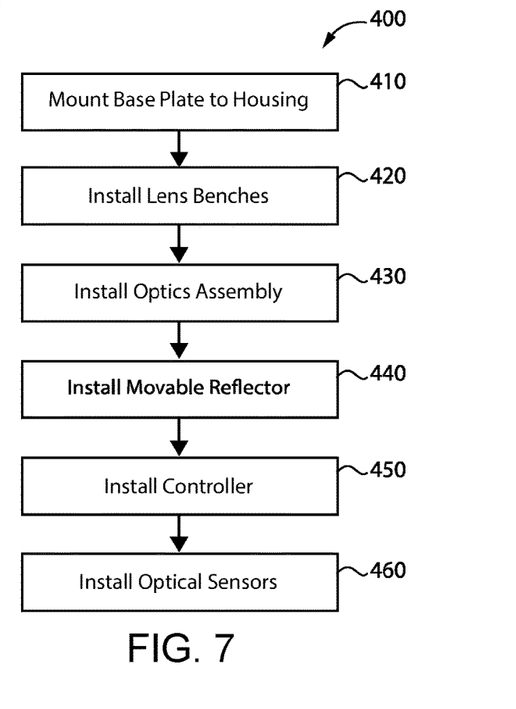

With additional reference to FIG. 7, an exemplary installation process 400 that may be performed using the illustrated add-on kit 200' is illustrated. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Furthermore, while the process 300 is described herein with specific reference to the AM machine 100, monitoring system 200, and associated kit 200' illustrated in FIGS. 1-4, it is to be appreciated that the process 300 may be performed with AM machines, monitoring systems, and/or kits having additional or alternative features.

In certain embodiments, the process 400 may be performed in connection with the above-described process 300 to complete the installing of block 310. In certain embodiments, the process 400 may be performed to install a sensor assembly 200 to an AM machine 100 prior to sale of the AM machine 100 to provide the system 90 as an original construction. It is also contemplated that the process 400 may involve purchasing an add-on kit 200' for an existing AM machine 100, and installing the kit 200' to the machine in situ to form the system 90 as a retrofit system.

In certain embodiments, the process 400 may include block 410, which generally involves mounting the base plate 210 to the housing 110 of the AM machine 100 in the vicinity of the first window 112. In certain forms, block 410 may involve releasably mounting the base plate 210 to the housing 110, for example via one or more threaded fasteners. In certain forms, block 410 may involve permanently mounting the base plate 210 to the housing 110, for example via welding. In certain embodiments, such as those in which the system 90 is provided as an original (non-retrofit) system, block 410 may be omitted.

The illustrated process 400 includes block 420, which generally involves installing the lens benches 220. For example, block 420 may involve securing the proximal ends 228 of the lens benches 220 to the optics assembly housing 231. As noted above, The optics assembly housing 231 and/or the proximal ends 228 of the lens benches 220 may include one or more quick-connect fittings 208 that facilitate removable coupling of the lens benches 220 with the optics assembly housing 231. It is also contemplated that the lens benches 220 may be permanently secured to the optics assembly housing 231. As described herein, however, it may be preferable in certain embodiments for the lens benches 220 to be easily removable, for example to facilitate modification of the installed monitoring assembly 200.

The illustrated process 400 includes block 430, which generally involves installing the optics assembly 230. For example, block 430 may involve mounting the optics assembly 230 to the housing 110 via the base plate 210, either before or after the base plate 210 is mounted to the housing 110. It is also contemplated that block 430 may involve mounting the optics assembly 230 directly to the housing 110 in the vicinity of the first window 112. The optics assembly 230 installed in block 430 generally includes a beam splitter 232, and may further include one or more mirrors 234, one or more filters, and/or an optics assembly housing 231 that houses at least a portion of the optics assembly 230.

The illustrated process 400 includes block 440, which generally involves installing the movable reflector 240. For example, block 440 may involve mounting the movable reflector 240 to the optics assembly housing 231 such that the movable reflector 240 is in the vicinity of the inlet aperture 233 of the optics assembly housing 231. When the monitoring assembly 200 is fully installed to the AM machine 100, the movable reflector 240 is also in the vicinity of the first window 112 such that the mirror 242 is operable to reflect EM radiation 204 from the FOV 202 in the region of interest (e.g., on the build plane 104) to the inlet aperture 233 for splitting by the beam splitter 232.

The illustrated process 400 includes block 450, which generally involves installing the controller 250. Installing the controller 250 generally involves placing the controller 250 in communication with the actuator 244 such that the controller 250 is operable to control the movable reflector 240 to adjust the FOV 202 seen by the optics assembly 230 (and thus the optical sensors 260). In certain embodiments, block 450 may further involve placing the controller 250 in communication with one or more of the optical sensors 260 such that the controller 250 is operable to receive information generated by the optical sensors 260. In certain embodiments, such as those in which the system 90 is provided as an original construction, the monitoring assembly 200 may not necessarily have a dedicated controller 250, and may instead be controlled by the control system 170 of the AM machine 100. Alternatively, a dedicated controller 250 may be considered to comprise a portion of the AM machine control system 170.

The illustrated process 400 includes block 460, which generally involves installing the optical sensors 260. In the illustrated form, block 460 involves threadedly engaging the threaded portion of each optical sensor housing 261 with the threaded distal end 229 of the corresponding lens bench 220. Block 460 may further include releasably securing the optical sensor housings 261 to the AM machine housing 110, e.g., via the base plate 210. Those skilled in the art will readily recognize that optical sensors configured for use in laboratory environments often include housings with quick coupling features (e.g., threaded features) to facilitate the rapid coupling of the housing 261 with a lens tube. In providing the distal ends 229 of the lens benches 220 with corresponding threaded features, the systems and methods described herein may facilitate the installation of the optical sensors. It should be appreciated, however, that in certain embodiments one or more of the optical sensor housings 261 may be permanently secured with the corresponding lens bench 220.

With the process 400 complete, provided is a system 90 that includes the AM machine 100 and the sensor assembly 200. As noted above, the system 90 may be an original construction that includes both the AM machine 100 and the sensor assembly 200 at the time of sale, or the system 90 may be a retrofit system in which an existing AM machine 100 has been retrofit with an add-on kit 200' to provide the AM machine 100 with a sensor assembly 200. Moreover, while the installation process 400 may be utilized to perform block 310 of the above-described process 300, it is also contemplated that the installation process 400 may be performed in connection with other processes, or may be performed as a standalone process.

Figure 8:
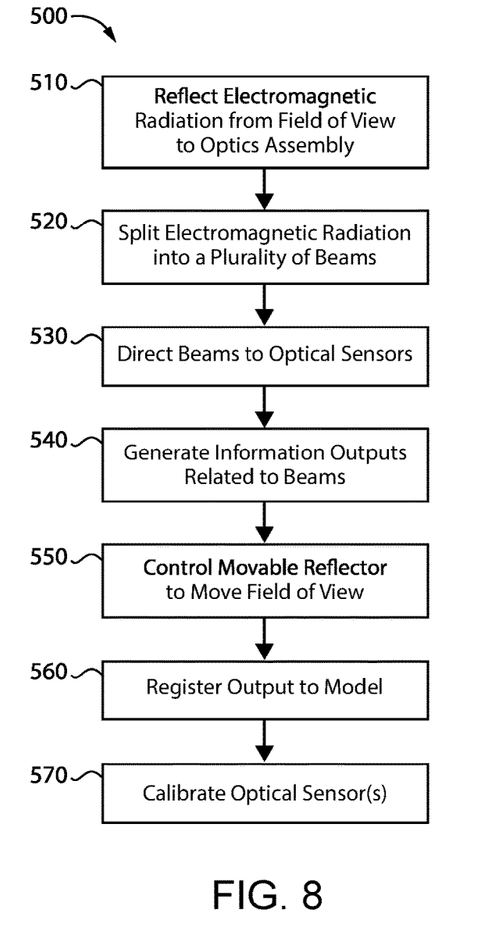

With additional reference to FIG. 8, an exemplary monitoring process 500 that may be performed using the system 90 and/or the monitoring assembly 200 is illustrated. As noted above, blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 500 is described herein with specific reference to the system 90 and monitoring assembly 200 illustrated in FIGS. 1-5, it is to be appreciated that the process 500 may be performed with systems and/or monitoring assemblies having additional or alternative features.

As described herein, the process 500 generally involves monitoring one or more parameters relating to a moving FOV 202 within a region of interest in an AM machine such as the AM machine 100. The process 500 may, for example, be performed at a time when the AM machine 100 is manufacturing a workpiece 80 in a layer-by-layer fashion. For example, the AM machine 100 may scan a build beam 151 (e.g., an energy beam, a build material jet, or a binder jet) across a region of interest (e.g., a build plane or a build region) to add material to the workpiece 80 at a moving build point 159. As will be evident from the descriptions herein, the process 500 may be utilized to monitor one or more process parameters relating to the building of the workpiece 80.

The process 500 includes block 510, which generally involves reflecting electromagnetic radiation from a field of view in a region of interest of an additive manufacturing machine to an optics assembly. Block 510 may, for example, be performed by a movable reflector such as the movable reflector 240. In the illustrated form, block 510 involves reflecting EM radiation 204 from the FOV 202 on the build plane 104 of the AM machine 100 to the optics assembly 230.

The process 500 also includes block 520, which generally involves splitting the electromagnetic radiation into a plurality of beams, wherein each beam has a corresponding and respective wavelength range. Block 520 may be performed by a beam splitter of the optics assembly, such as the beam splitter 232 of the illustrated optics assembly 230. For example, block 520 may involve the beam splitter 232 splitting the EM radiation 204 reflected by the movable reflector 240 into a plurality of beams 206. In certain embodiments, two or more of the beams 206 may have the same wavelength range upon being split by the beam splitter 232. In certain embodiments, two or more of the beams 206 may have different wavelength ranges upon being split by the beam splitter 232.

The process 500 also includes block 530, which generally involves directing each beam of the plurality of beams to a corresponding and respective optical sensor of a plurality of optical sensors. Block 530 may, for example, be performed at least in part by the optics assembly 230 and/or at least in part by the lens benches 220. For example, the mirrors 234 of the optics assembly 230 may direct each beam 206 through the proximal end 228 of the corresponding lens bench 220 such that each lens bench 220 directs the corresponding beam 206 to the corresponding optical sensor 260. In directing the beams 206 to the optical sensors 260, one or more of the lens benches 220 may condition the corresponding beam 206 to a state more suitable for use with the corresponding optical sensor 260. In such forms, the lens benches 220 may be considered to comprise a portion of the optics assembly 230. As one example, one or more of the lens benches 220 may comprise one or more lenses 222 that aid in focusing the corresponding beam 206 on the sensing region 262 of the corresponding optical sensor 260. As another example, one or more of the lens benches 220 may comprise one or more filters 224 that filter one or more frequencies of EM radiation from the corresponding beam 206 before the beam 206 strikes the sensing region 262 of the corresponding optical sensor 260.

The process 500 also includes block 540, which generally involves generating a plurality of outputs, each output corresponding to a corresponding and respective beam. Block 540 may be performed at least in part by the plurality of optical sensors 260. For example, the first optical sensor 260*a* may generate output information related to the first beam 206*a*, and the second optical sensor 260*b* may generate output information related to the second beam 206*b*. While other forms are contemplated, in the illustrated embodiment, the plurality of optical sensors 260 generate the plurality of outputs contemporaneously. Due to the fact that each optical sensor 260 is receiving EM radiation from the same FOV 202, contemporaneous generation of output information enables the outputs to be registered to one another, which may facilitate comparison of the information output by the optical sensors 260.

In certain embodiments, each output may be provided in the form of an information stream. In certain embodiments, such as those in which one or more of the optical sensors 260 has a high sampling rate, one or more information streams may have a correspondingly high refresh rate or temporal resolution. For example, some pyrometers 292 have a sampling rate of 100,000 samples per second or greater. In certain embodiments, such as those in which one or more of the optical sensors 260 has a relatively low sampling rate, one or more information streams may have a relatively low refresh rate or temporal resolution. For example, high-speed cameras 291 currently available generally have sampling rates of 250 to 10,000 frames per second. It is also contemplated that even lower sampling rates may be associated with an information stream, for example in embodiments in which sampling rate or temporal resolution is sacrificed in favor of image quality or spatial resolution.

In certain embodiments, two or more of the beams 206 may be substantially identical when received by the optical sensors 260. For example, each of the first beam 206*a* and the second beam 206*b* may have been subjected to the same conditioning (e.g., focusing and/or filtering) such that each beam 206*a*, 206*b* comprises or primarily comprises EM radiation within the same wavelength range. In certain embodiments, two or more of the beams 206 may be significantly different (e.g., of different wavelength bands) when received by the optical sensors 260. For example, the first beam 206*a* and the second beam 206*b* may have been split based on wavelength and/or subjected to different forms of conditioning (e.g., focusing and/or filtering) such that the first beam 206*a* and the second beam 206*b* comprise or primarily comprise EM radiation within different wavelength ranges.

The process 500 also includes block 550, which generally involves controlling the movable reflector to move the field of view to maintain a predetermined relationship between the field of view and a moving build point within the region of interest. Block 550 may, for example, involve the control system 170 and/or the controller 250 operating the actuator 244 of the movable reflector 240 to move the mirror 242. For example, block 550 may involve the control system 170 and/or the controller 250 controlling the movable reflector 240 to move the FOV 202 to maintain a predetermined relationship between the FOV 202 and the moving build point 159, which is within the region of interest (e.g., the build plane 104). In various embodiments, to maintain a predetermined relationship between the FOV 202 and the moving build point 159 may comprise one or more of the following: maintaining the moving build point 159 within the FOV 202; maintaining the moving build point 159 within or adjacent the FOV 202; maintaining the moving build point 159 adjacent the FOV 202; maintaining the moving build point 159 outside the FOV 202. Further details on example methods by which the predetermined relationship between the FOV 202 and the build point 159 may be maintained are provided above with reference to FIG. 5.

In certain embodiments, the process 500 may include block 560, which generally involves registering at least one data point of at least one output of the plurality of outputs to a model of a workpiece being constructed by the moving build point. Block 560 may, for example, be performed by the control system 170 and/or the controller 250. By way of illustration, the control system 170 and/or the controller 250 may be provided with or otherwise have access to the model by which the workpiece 80 is being constructed, and may correlate the outputs generated by one or more of the optical sensors 260 with the location on the model that corresponds to the location of the build point 159 at the time that the output was generated. Further details regarding such registration and the potential benefits thereof are provided above with reference to FIG. 5.

In certain embodiments, the process 500 may include block 570, which generally involves calibrating at least one optical sensor of the plurality of optical sensors based upon a comparison of the output generated by the at least one optical sensor with the output generated by at least one other optical sensor of the plurality of optical sensors. Block 570 may, for example, be performed at least in part by the control system 170 and/or the controller 250. For example, if it is suspected that the first optical sensor 260*a* is generating biased or otherwise incorrect information, the first optical sensor 260*a* may be calibrated based upon a comparison of the output of the first optical sensor 260a with the output of the second optical sensor 260b. As noted above, the beams 206a, 206b can be provided as substantially identical when received at the optical sensors 260 (e.g., in embodiments in which the EM radiation 204 is split without regard to wavelength and the beams 206 are subjected to the same conditioning). Thus, in embodiments in which the beams 206a, 206b are substantially identical and the optical sensors 260a, 260b are substantially identical, the outputs of the optical sensors 260a, 260b should be substantially identical. A divergence in the outputs may be indicative of improper calibration of one or both optical sensors 260a, 260b, which may be rectified by calibrating the errant optical sensor 260 using another of the other optical sensors 260.

As noted above, the monitoring process 500 may, for example, be utilized to perform block 320 of the process 300. It is also contemplated that the process 500 may be utilized in connection with other processes (e.g., those in which the monitoring assembly 200 has been installed according to a method other than the installation process 400), or may be performed as a standalone process.

Figure 9:
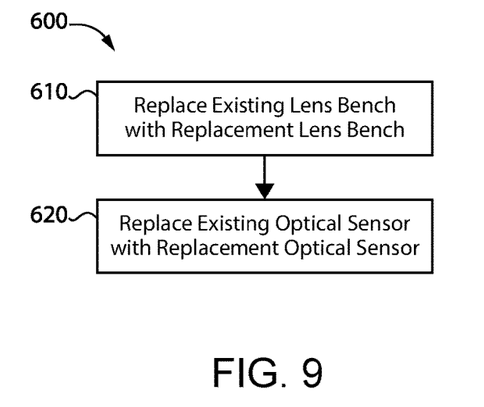

With additional reference to FIG. 9, an exemplary modification process 600 that may be performed using the monitoring assembly 200 is illustrated. As noted above, blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 600 is described herein with specific reference to the monitoring assembly 200 illustrated in FIGS. 1-4, it is to be appreciated that the process 600 may be performed with monitoring assemblies having additional or alternative features.

In certain circumstances, it may be desirable to exchange one or more of the lens benches 220 with another lens bench, such as a different configuration of lens bench. In such forms, the process 600 may include block 610, which generally involves replacing an existing lens bench 220 with a replacement lens bench. In certain embodiments, the replacement lens bench may have at least one characteristic different from the existing lens bench 220, such as length, presence and/or configuration of lens(es) 222, and/or presence and/or configuration of filter(s) 224.

In situations in which the lens bench 220 to be replaced is releasably secured to the optics assembly housing 231, block 610 may involve manipulating the proximal fittings 208 in a decoupling manner to remove the lens bench 220 from the housing 231. For example, in embodiments in which the fittings 208 comprise engaged threads, block 610 may involve rotating the lens bench 220 to unscrew the lens bench 220 from the optics assembly housing 231. With the existing lens bench 220 removed, the proximal end 228 of the replacement lens bench 220 may be coupled with the optics assembly housing 231 by manipulating the proximal fittings 208 in a coupling manner.

In situations in which the lens bench 220 to be replaced is releasably secured to the corresponding optical sensor housing 261 assembly housing 231, block 610 may involve manipulating the distal fittings 208 in a decoupling manner to remove the lens bench 220 from the optical sensor housing 261. For example, in embodiments in which the distal fittings 209 comprise engaged threads, block 610 may involve causing relative rotation of the lens bench 220 and the optical sensor 260 to unscrew the lens bench 220 from the optical sensor housing 261. With the existing lens bench 220 removed from the optical sensor 260, the distal end 229 of the replacement lens bench 220 may be coupled with the optical sensor housing 261 by manipulating the distal fittings 209 in a coupling manner. It is also contemplated that the replacement lens bench 220 may be coupled to a replacement optical sensor 260, for example in embodiments in which the process 600 involves block 620.

In certain circumstances, it may be desirable to exchange one or more of the optical sensors 260 with another optical sensor, such as a different configuration of optical sensor. In such forms, the process 600 may include block 620, which generally involves replacing an existing optical sensor 260 with a replacement optical sensor 260. In certain embodiments, the replacement optical sensor 260 may have at least one characteristic different from the existing lens bench 220, such as the type of optical sensor 260 (e.g., camera 291, pyrometer 292, photodiode 293, phototransistor 294, photoresistor 295), the wavelength band configured to be sensed by the optical sensor 260, the sampling rate of the optical sensor 260, and/or other characteristics.

In situations in which the optical sensor 260 to be replaced is releasably secured to the corresponding lens bench 220, block 620 may involve manipulating the distal fittings 209 in a decoupling manner to remove the optical sensor 260 from the lens bench 220. For example, in embodiments in which the fittings 209 comprise engaged threads, block 620 may involve causing relative rotation of the lens bench 220 and the optical sensor 260 to unscrew the lens bench 220 from the optical sensor housing 261. With the existing lens bench 220 removed, the distal end 229 of the existing lens bench 220 (or that of a replacement lens bench 220) may be coupled with the housing 261 of the replacement optical sensor 260 by manipulating the distal fittings 209 in a coupling manner.

As should be evident from the foregoing, certain embodiments of the systems and methods described herein provide a non-restrictive sensor interface 201 by which modular components of the monitoring assembly 200 can be replaced as warranted. Such modularity and ease of modification may provide the user with one or more advantages. For example, the systems and methods described herein may enable greater flexibility than traditional monitoring assemblies. By way of illustration, certain high-end cameras may cost upwards of a hundred thousand dollars, but can often be rented for a limited time at a fraction of that cost. As such, a group with limited resources may find it advantageous to rent the camera for a limited run of experiments. Upon being provided with the camera and an appropriately-configured lens bench, the group would be able to easily install and remove the rented camera for the limited duration of the experiments.

Given the above-noted cost associated with certain forms of optical sensors 260, an add-on kit 200' according to certain embodiments may not necessarily include the sensors 260. In certain forms, a kit 200' may be provided in a form that comprises the base plate 210, the optics assembly 230, the movable reflector 240, and the controller 250 as a modular unit. Such a modular unit may be installed to the AM machine 100, and the optical sensors 260 and/or the lens benches 220 may be rented out for use with the installed unit.

It should be appreciated that the systems and methods described herein may provide for repeatable calibration between in-situ process-monitoring sensors and physics-based models. This objective may be achieved at least in part by the non-restrictive sensor interface (NRSI) 201 described above, which is an off-axis optical design that may integrate commercial off-the-shelf, optical, in-situ process monitoring sensors. This NRSI 201 may allow for two or more interchangeable sensors 260 to observe the region of interest at the same FOV 202. The NRSI 201 scanner system tracks the build point 159 to maintain a predetermined relationship between the FOV 202 and the build point 159. One result that may be provided is a system that synchronizes a pair of arbitrary optical sensors 260 such that they view a single FOV 202 surrounding the build point 159, using a common viewing angle. The NRSI 201 system is non-obtrusive, and may not necessarily require modifications to existing hardware of the AM machine 100. Also, unlike sensors placed in-line with the build beam 151, the NRSI 201 system may avoid affecting the build beam 151 (e.g., via thermal lensing) and/or obviate the many complications associated with using lossy mirrors.

Note that since the imaging FOV 202 may be on the order of $10^4$ times larger than the build point 159, the speed and agility required for the movable reflector 240 are far less demanding than for the galvanometer 160 for the energy beam 151. As a result, the in-situ data may be collected at and around the build point 159 at all times, simplifying the registration of the in-situ data to the build plan track vectors.

As noted above, the reflected EM radiation 204 will pass through a beam splitter 232, which will create a plurality of beams 206 of EM radiation (e.g., light). In certain embodiments, the beam splitter 232 may create two orthogonal beams 206 of light, one for imaging in the 0.4 µm to 2 µm waveband (VIS and SWIR), and the other for imaging in the 2 µm to 5 µm waveband (MWIR). Both beams 206 may pass through optics that enables Airy disk radius for imaging on the build plane to be 60 µm, 40 µm, and 12 µm in the MWIR, SWIR, and VIS wavebands, respectively. A folding mirror 234 may bend one beam 206 and orient it parallel to the other beam 206. These optical elements comprise aft optics, which will may be secured within an enclosure or housing 231. The egress for each beam may be a lens bench 220 to which a sensor 260 is connected.

Each lens bench 220 may be provided as a standard two-inch diameter optical tube that blocks stray light, and which may provide mounting locations where additional lenses may be inserted to focus the beam 206 as required by the particular optical sensor 260 being utilized. The lens benches 220 may be bolted to the optics enclosure 231 at the proximal end 228 and threaded onto the sensor housing 261 at the distal end 229.

As noted above, the movable reflector 240 may include a scanning motor 244 with an optical mirror 242 mounted on its shaft, and a detector 246 that provides feedback to the controller 250. In certain embodiments, the controller 250 may utilize a function generator with a square or sine wave output to emulate an input signal to activate the movable reflector 240 to traverse its range. A programmable voltage source may be used to emulate the movement of the build galvanometer 160 to trace the sequence of build plan track vectors.

It should be appreciated that the NRSI 201 comprising the movable reflector 240 and optics assembly 231 provides a reusable system for off-axis in-situ sensing. An off-the-shelf sensor 260 may be connected to this system using a lens bench 220, and one or more of the sensors 260 can updated or exchanged as needed. Embodiments and modifications of this NRSI 201 may be usable with many forms of existing AM machines 100, and therefore may be of benefit to many parties.

Figure 10:
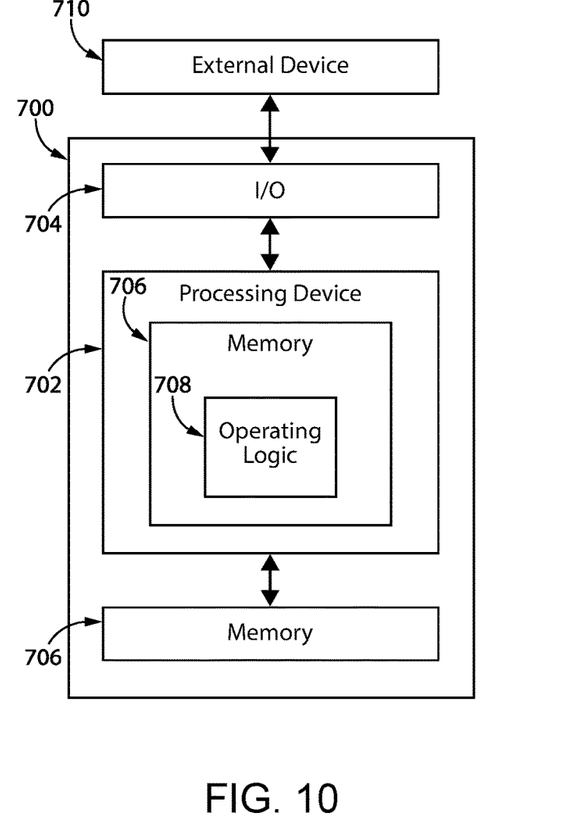
FIG. 10 is a schematic block diagram of a computing device that may be utilized in connection with certain embodiments.

Referring now to FIG. 10, a simplified block diagram of at least one embodiment of a computing device 700 is shown. The illustrative computing device 700 depicts at least one embodiment of a control system or controller that may be utilized in connection with the control system 170 and/or controller 250 illustrated in FIGS. 1-4.

Depending on the particular embodiment, the computing device 700 may be embodied as a server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

The computing device 700 includes a processing device 702 that executes algorithms and/or processes data in accordance with operating logic 708, an input/output device 704 that enables communication between the computing device 700 and one or more external devices 710, and memory 706 which stores, for example, data received from the external device 710 via the input/output device 704.

The input/output device 704 allows the computing device 700 to communicate with the external device 710. For example, the input/output device 704 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), Wi-Fi®, WiMAX, etc.) to effect such communication depending on the particular computing device 700. The input/output device 704 may include hardware, software, and/or firmware suitable for performing the techniques described herein.

The external device 710 may be any type of device that allows data to be inputted or outputted from the computing device 700. For example, in various embodiments, the external device 710 may be embodied as the build table 120, the powder distributor 130, the reservoir 140, the beam generator 150, the mirror galvanometer 160, movable reflector 240, and/or the optical sensors 260. Further, in some embodiments, the external device 710 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 710 may be integrated into the computing device 700.

The processing device 702 may be embodied as any type of processor(s) capable of performing the functions described herein. In particular, the processing device 702 may be embodied as one or more single or multi-core processors, microcontrollers, or other processor or processing/controlling circuits. For example, in some embodiments, the processing device 702 may include or be embodied as an arithmetic logic unit (ALU), central processing unit (CPU), digital signal processor (DSP), and/or another suitable processor(s). The processing device 702 may be a programmable type, a dedicated hardwired state machine, or a combination thereof. Processing devices 702 with multiple processing units may utilize distributed, pipelined, and/or parallel processing in various embodiments. Further, the processing device 702 may be dedicated to performance of just the operations described herein, or may be utilized in one or more additional applications. In the illustrative embodiment, the processing device 702 is of a programmable variety that executes algorithms and/or processes data in accordance with operating logic 708 as defined by programming instructions (such as software or firmware) stored in memory 706. Additionally or alternatively, the operating logic 708 for processing device 702 may be at least partially defined by hardwired logic or other hardware. Further, the processing device 702 may include one or more components of any type suitable to process the signals received from input/output device 704 or from other components or devices and to provide desired output signals. Such components may include digital circuitry, analog circuitry, or a combination thereof.

The memory 706 may be of one or more types of non-transitory computer-readable media, such as a solid-state memory, electromagnetic memory, optical memory, or a combination thereof. Furthermore, the memory 706 may be volatile and/or nonvolatile and, in some embodiments, some or all of the memory 706 may be of a portable variety, such as a disk, tape, memory stick, cartridge, and/or other suitable portable memory. In operation, the memory 706 may store various data and software used during operation of the computing device 700 such as operating systems, applications, programs, libraries, and drivers. It should be appreciated that the memory 706 may store data that is manipulated by the operating logic 708 of processing device 702, such as, for example, data representative of signals received from and/or sent to the input/output device 704 in addition to or in lieu of storing programming instructions defining operating logic 708. As illustrated, the memory 706 may be included with the processing device 702 and/or coupled to the processing device 702 depending on the particular embodiment. For example, in some embodiments, the processing device 702, the memory 706, and/or other components of the computing device 700 may form a portion of a system-on-a-chip (SoC) and be incorporated on a single integrated circuit chip.

In some embodiments, various components of the computing device 700 (e.g., the processing device 702 and the memory 706) may be communicatively coupled via an input/output subsystem, which may be embodied as circuitry and/or components to facilitate input/output operations with the processing device 702, the memory 706, and other components of the computing device 700. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 700 may include other or additional components, such as those commonly found in a typical computing device (e.g., various input/output devices and/or other components), in other embodiments. It should be further appreciated that one or more of the components of the computing device 700 described herein may be distributed across multiple computing devices. In other words, the techniques described herein may be employed by a computing system that includes one or more computing devices. Additionally, although only a single processing device 702, I/O device 704, and memory 706 are illustratively shown in FIG. 10, it should be appreciated that a particular computing device 700 may include multiple processing devices 702, I/O devices 704, and/or memories 706 in other embodiments. Further, in some embodiments, more than one external device 710 may be in communication with the computing device 700.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An add-on kit for an additive manufacturing machine configured to scan a build beam across a region of interest to thereby add material to a workpiece at a moving build point located in the region of interest, the add-on kit comprising:
    a base plate configured for mounting to the additive manufacturing machine;
    an optics assembly mounted to the base plate, the optics assembly comprising a housing and a beam splitter positioned within the housing, wherein the housing comprises a plurality of outlet apertures, wherein the beam splitter configured to split electromagnetic radiation entering the optics assembly into a plurality of beams, and wherein the optics assembly is configured to direct each beam of the plurality of beams to a corresponding outlet aperture of the plurality of outlet apertures;
    a plurality of lens benches, wherein each lens bench includes a proximal end and an opposite distal end, wherein the proximal end of each lens bench is coupled with the housing adjacent a corresponding outlet aperture of the plurality of outlet apertures such that each lens bench is operable to receive a corresponding beam of the plurality of beams, and wherein each lens bench is configured to direct the corresponding beam to the distal end of the lens bench;
    a movable reflector configured to reflect electromagnetic radiation from within a field of view to the optics assembly such that each beam comprises electromagnetic radiation from the field of view; and
    a controller configured to move the movable reflector to maintain a predetermined relationship between the moving build point and the field of view.

2. The add-on kit of claim 1 wherein at least one lens bench of the plurality of lens benches is removably coupled to the housing.

3. The add-on kit of claim 1 further comprising a plurality of optical sensors;
    wherein each optical sensor is coupled with the distal end of a corresponding lens bench of the plurality of lens benches; and wherein each optical sensor is configured to generate information related to the beam directed along the corresponding lens bench.

4. The add-on kit of claim 3, wherein the plurality of optical sensors are configured to contemporaneously generate the information related to the beam directed along the corresponding lens bench.

5. The add-on kit of claim 3, wherein at least one of the optical sensors comprises a camera.

6. The add-on kit of claim 1 wherein, within the distal end portion of a first lens bench of the plurality of lens benches, a first beam of the plurality of beams primarily comprises electromagnetic radiation within a first wavelength range; and wherein, within the distal end portion of a second lens bench of the plurality of lens benches, a second beam of the plurality of beams primarily comprises electromagnetic radiation within a second wavelength range different from the first wavelength range.

7. The add-on kit of claim 6, further comprising:
a first optical sensor configured to generate information relating to electromagnetic radiation within the first wavelength range, wherein the first beam is directed by the first lens bench to the first optical sensor; and
a second optical sensor configured to generate information relating to electromagnetic radiation within the second wavelength range, wherein the second beam is directed by the second lens bench to the second optical sensor.

8. The add-on kit of claim 6, wherein the first wavelength range comprises visible light; and
wherein the second wavelength range comprises infrared radiation.

9. The add-on kit of claim 1 wherein each lens bench of the plurality of lens benches comprises at least one threaded end portion.

10. The add-on kit of claim 1 wherein at least one lens bench of the plurality of lens benches comprises a portion of the optics assembly.

11. The add-on kit of claim 1 further comprising an optical sensor including a housing and a sensing region positioned within the housing;
wherein the housing of the optical sensor is threadedly engaged with the distal end of a first lens bench of the plurality of lens benches.

12. The add-on kit of claim 1, wherein the field of view has an area of 200 mm$^2$ or less.

13. The add-on kit of claim 1, wherein to maintain a predetermined relationship between the moving build point and the field of view comprises maintaining the moving build point within the field of view.

14. A system, comprising:
an additive manufacturing machine configured to selectively scan a build beam across a region of interest to thereby add material to a workpiece at a moving build point located in the region of interest; and
a first optical sensor configured to generate information related to electromagnetic radiation within a first wavelength range;
a second optical sensor configured to generate information related to electromagnetic radiation within a second wavelength range;
an optics assembly comprising a beam splitter configured to split electromagnetic radiation entering the optics assembly into a first beam and a second beam, to direct the first beam to the first optical sensor, and to direct the second beam to the second optical sensor, wherein the first beam comprises electromagnetic radiation within the first wavelength range upon reaching the first optical sensor, and wherein the second beam comprises electromagnetic radiation within the second wavelength range upon reaching the second optical sensor;
a movable reflector configured to reflect electromagnetic radiation from the region of interest to the optics assembly such that each of the first optical sensor and the second optical sensor is provided with a field of view in the region of interest; and
a controller configured to move the movable reflector to maintain a predetermined relationship between the moving build point and the field of view;
wherein the build beam travels along a build beam path from a build beam source to the build point; and
wherein neither the movable reflector nor the beam splitter is positioned within the build beam path.

15. The system of claim 14, wherein the first wavelength range is different from the second wavelength range.

16. The system of claim 14, wherein each of the first wavelength range and the second wavelength range comprises at least one of X-rays, ultraviolet light, visible light, or infrared rays.

17. The system of claim 14, wherein the first optical sensor comprises an infrared camera; and
wherein the second optical sensor comprises a visible light camera.

18. The system of claim 14, further comprising:
a housing, wherein the optics assembly is positioned at least partially within the housing;
a first lens bench having a first proximal end and a first distal end, wherein the first proximal end is removably coupled to the housing, and wherein the first distal end is removably coupled to the first optical sensor; and
a second lens bench having a second proximal end and a second distal end, wherein the second proximal end is removably coupled to the housing, and wherein the second distal end is removably coupled to the second optical sensor.

19. A method, comprising:
reflecting, by a movable reflector, electromagnetic radiation from a field of view in a region of interest of an additive manufacturing machine to an optics assembly, wherein the build beam travels along a build beam path from a build beam source to the region of interest;
splitting, by a beam splitter of the optics assembly, the electromagnetic radiation into a plurality of beams;
directing the plurality of beams to a plurality of optical sensors such that each optical sensor of the plurality of optical sensors receives a corresponding and respective beam of the plurality of beams;
generating, by the plurality of optical sensors, a plurality of outputs, each output including information related to a corresponding and respective beam; and
controlling, by a controller, the movable reflector to move the field of view to maintain a predetermined relationship between the field of view and a moving build point within the region of interest;
wherein the build beam path intersects neither the movable reflector nor the beam splitter.

20. The method of claim 19, wherein the moving build point has an average build point velocity during a first timeframe;
wherein the method further comprises selecting a field of view velocity based on the average build point velocity; and wherein controlling the movable reflector comprises moving the field of view with the field of view velocity for at least a portion of the first timeframe.

21. The method of claim 20, wherein selecting the field of view velocity based on the average build point velocity comprises selecting the field of view velocity as the average build point velocity.

22. The method of claim 19, wherein at least a portion of the optics assembly is located within a housing;
wherein a first optical sensor of the plurality of optical sensors is connected with the housing via a first lens bench;
wherein the method further comprises replacing the first optical sensor with a second optical sensor; and
wherein replacing the first optical sensor with the third optical sensor comprises:
unscrewing the first optical sensor from a distal end of the first lens bench; and
screwing the second optical sensor into the distal end of the first lens bench.

23. The method of claim 19, wherein each output of the plurality of outputs comprises a corresponding and respective information stream.

24. The method of claim 19, wherein the plurality of outputs comprises:
a first image information stream generated by a first optical sensor of the plurality of optical sensors, the first image information stream comprising first images generated based upon a first wavelength range; and
a second image information stream generated by a second optical sensor of the plurality of optical sensors, the second image information stream comprising second images generated based upon a second wavelength range different from the first wavelength range.

25. The method of claim 19, wherein a first beam of the plurality of beams is received by a first optical sensor of the plurality of optical sensors, and primarily comprises electromagnetic radiation within a first wavelength range when received by the first optical sensor;
wherein a second beam of the plurality of beams is received by a second optical sensor of the plurality of optical sensors, and primarily comprises electromagnetic radiation within a second wavelength range when received by the second optical sensor; and
wherein the first wavelength range is different from the second wavelength range.

26. The method of claim 19, wherein the plurality of outputs are generated contemporaneously.

27. The method of claim 19, wherein to maintain a predetermined relationship between the field of view and the moving build point comprises maintaining the moving build point within the field of view.

28. The method of claim 19, further comprising registering at least one data point of at least one output of the plurality of outputs to a model of a workpiece being constructed by the moving build point.

29. The method of claim 28, wherein the registering comprises correlating the at least one data point with a location on the model corresponding to a location of the build point at a time the at least one data point was generated.

30. The method of claim 19, further comprising calibrating at least one optical sensor of the plurality of optical sensors based upon a comparison of the output generated by the at least one optical sensor with the output generated by at least one other optical sensor of the plurality of optical sensors.

31. The method of claim 19, wherein the controlling is performed based upon a model of a workpiece being constructed by the moving build point.

* * * * *